(12) United States Patent
Wood (10) Patent No.: US 8,279,864 B2
(45) Date of Patent: *Oct. 2, 2012

(54) POLICY BASED QUALITY OF SERVICE AND ENCRYPTION OVER MPLS NETWORKS

(75) Inventor: Daniel M. Wood, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1031 days.

This patent is subject to a terminal disclaimer.

(21) Appl. No.: 11/558,682

(22) Filed: Nov. 10, 2006

(65) Prior Publication Data

US 2008/0112410 A1   May 15, 2008

(51) Int. Cl.
*H04L 12/28* (2006.01)
*H04J 3/16* (2006.01)

(52) U.S. Cl. ......... 370/389; 370/392; 370/401; 370/468

(58) Field of Classification Search ................... 370/468
See application file for complete search history.

(56) References Cited

U.S. PATENT DOCUMENTS

| | | | | |
|---|---|---|---|---|
| 7,068,654 | B1* | 6/2006 | Joseph et al. | 370/392 |
| 7,477,657 | B1* | 1/2009 | Murphy et al. | 370/468 |
| 2001/0019554 | A1* | 9/2001 | Nomura et al. | 370/389 |
| 2002/0191572 | A1* | 12/2002 | Weinstein et al. | 370/338 |
| 2003/0053414 | A1* | 3/2003 | Akahane et al. | 370/216 |
| 2003/0081595 | A1* | 5/2003 | Nomura et al. | 370/353 |
| 2003/0147352 | A1* | 8/2003 | Ishibashi et al. | 370/248 |
| 2004/0076154 | A1* | 4/2004 | Mizutani et al. | 370/389 |
| 2004/0114595 | A1* | 6/2004 | Doukai | 370/389 |
| 2004/0196843 | A1* | 10/2004 | Zinin | 370/389 |
| 2004/0221051 | A1* | 11/2004 | Liong et al. | 709/230 |
| 2005/0177749 | A1* | 8/2005 | Ovadia | 713/201 |
| 2005/0262264 | A1* | 11/2005 | Ando et al. | 709/233 |
| 2006/0015450 | A1* | 1/2006 | Guck et al. | 705/39 |
| 2006/0294219 | A1* | 12/2006 | Ogawa et al. | 709/224 |
| 2007/0071029 | A1* | 3/2007 | White et al. | 370/466 |
| 2007/0133559 | A1* | 6/2007 | Ko et al. | 370/395.21 |
| 2007/0211735 | A1* | 9/2007 | Williamson | 370/401 |

OTHER PUBLICATIONS

RFC 3209, RSVP-TE: Extensions to RSVP for LSP Tunnels, D. Awduche et al., Dec. 2001.*

* cited by examiner

*Primary Examiner* — Brandon Renner (57) ABSTRACT

A network device may store a plurality of LSP labels each associated with a network policy and desired quality of service, wherein each LSP label defines a path through a multi-protocol label switching (MPLS) network. Upon receiving a request to transmit data in accordance with a network policy and desired quality of service, the network device may transmit an appropriate LSP label for transmission through the MPLS network.

18 Claims, 7 Drawing Sheets

POLICY BASED QUALITY OF SERVICE AND ENCRYPTION OVER MPLS NETWORKS

BACKGROUND INFORMATION

In order to send data with a required Quality of Service (QoS) from a first network across a second network, such as an encrypted Multiprotocol Label Switching (MPLS) network, a signal may be sent from the first network through the second network indicating a that a required QoS is desired. An unwanted result of sending the required QoS signal through the second network is that outside parties monitoring the network signals may be alerted to the fact that the data to be transmitted with a required QoS may contain sensitive information.

BRIEF DESCRIPTION OF THE DRAWINGS

The accompanying drawings, which are incorporated in and constitute a part of this specification, illustrate embodiments of the systems and methods described herein and, together with the description, explain the embodiments. In the drawings.

DETAILED DESCRIPTION OF PREFERRED EMBODIMENTS

The following detailed description of the preferred embodiments refers to the accompanying drawings. The same reference numbers in different drawings may identify the same or similar elements. Also, the following detailed description does not limit the embodiments. Systems and methods described herein may provide policy based desired quality of service transmissions over an encrypted MPLS network.

Figure 1:
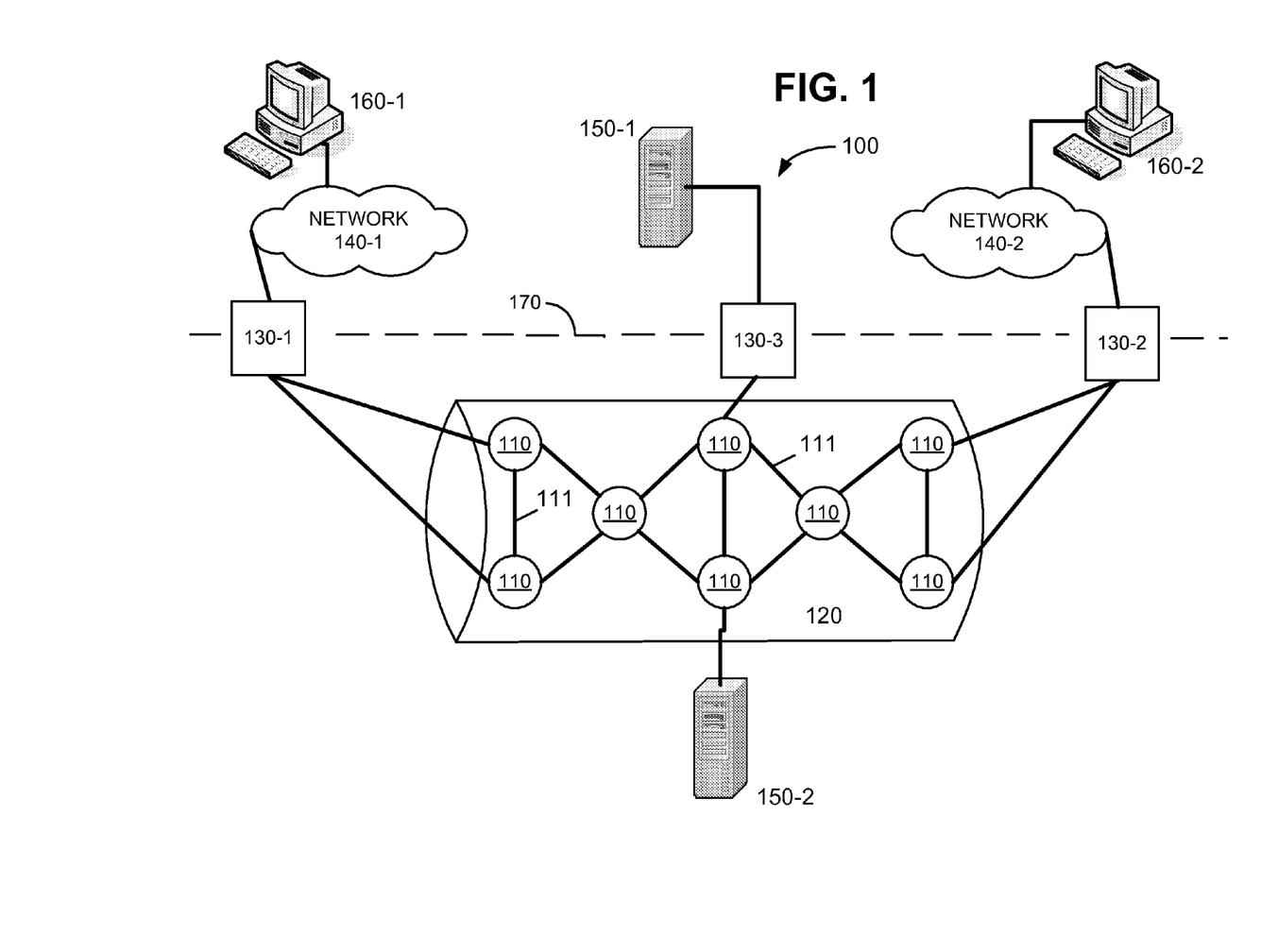
FIG. 1 is a diagram illustrating an exemplary system in which systems and methods consistent with the embodiments described herein may be implemented.

FIG. 1 is a diagram illustrating an exemplary network 100 in which systems and methods described herein may be implemented. In one implementation, network 100 may include, for example, a plurality of network devices 110, connected by a plurality of links 111 that form an MPLS network 120, a plurality of MPLS encryptors 130, a plurality of networks 140, a plurality of servers 150, and a plurality of client devices 160.

Network devices 110 may include any network device, such as a computer, a router (e.g., a label switching router (LSR)), a switch, a network interface card (NIC), a hub, a bridge, etc. Links 111 may include one or more paths that permit communications among network devices 110, such as wired, wireless, and/or optical connections. A network device 110 configured as an LSR for example, may receive datagrams from MPLS encryptor 130. Each network device 110 configured as an LSR along a label switched path (LSP), may make a forwarding decision based on the label carried in the MPLS header (e.g. an MPLS shim header) and may not make such a decision based on the destination address carried in a network layer header of the datagram. That is, the datagram forwarding process may be based on the concept of label switching. In this way, a LSP may identify the specific path of network devices 110 and links 111 that a datagram(s) takes through MPLS network 120. The labeled datagram may be forwarded along the LSP by each network device 110 for example, until it eventually arrives at MPLS encryptor 130 that may be configured as an egress LSR. The MPLS header may be removed from the datagram by either egress MPLS encryptor 130 or by the network device LSR 110 preceding the MPLS encryptor 130.

To optimize the route or path selection process, the physical path of a LSP may not be restricted to the shortest path that one or more routers executing an interior gateway protocol (IGP) would select to reach a destination. The physical path for a LSP may be defined using an explicit route. An explicit route may be a preconfigured sequence of network devices 110 (LSRs) that define the physical path of the LSP. Explicit routes may allow physical paths to be defined that override the shortest path routes established by conventional IP routing (e.g., by IGPs). For example, explicit routes may be used to route traffic around congested points in network 120, to optimize resource utilization across network 120, and/or to satisfy network and administrative policy constraints as described in greater detail below.

Network 120 may include a plurality of network devices 110 interconnected by links 111 that form an MPLS network 110 described above, for example. While eight network devices 110 and eleven links 111 are shown in FIG. 1, more or fewer network devices 110 and links 111 may be used in other implementations consistent with the embodiments described herein. Network 120 may also include other components, devices, etc., not shown in FIG. 1.

MPLS encryptors 130 may include hardware and software for receiving, encrypting and transmitting data between networks, for example. MPLS encryptor 130 may be configured as an ingress LSR (entry point of a datagram), and MPLS encryptor 130 may also be configured as an egress LSR (or exit point of a datagram) in network 120. MPLS encryptor 130 may form a datagram, and may classify the datagram based on a variety of factors into a forwarding equivalent class (FEC). A FEC may include a set of datagrams that may be treated the same for forwarding purposes and may be mapped to a single label. A datagram may be encapsulated in a MPLS header that may contain a short, fixed-length locally-assigned label that may be based on the FEC. MPLS encryptor 130 may forward a datagram with the MPLS header to the next-hop LSR, e.g., to a next network device 110. MPLS encryptor 130 may also be configured to perform processing and encryption of data as described in detail below.

Networks 140 may include one or more networks including an Internet-protocol (IP) network, a telephone network, such as the public switched telephone network (PSTN), a metropolitan area network (MAN), a wide area network (WAN), a local area network (LAN), or a combination of networks. Network 140 may be referred to as a trusted network, for example. Network 140 may also include devices such as switches, routers, firewalls, gateways, and/or servers (not shown) used to transmit/receive and route data to/from other connected network devices.

Networks 140 may be a hardwired network using wired conductors and/or optical fibers and/or may be a wireless network using free-space optical and/or radio frequency (RF) transmission paths. Implementations of network 140 and/or devices operating on network 140 described herein are not limited to any particular data type, and/or protocol.

Servers 150 may include one or more processors or microprocessors enabled by software programs to perform functions, such as data storage and transmission, coder decoder (codec) conversion, and interfacing with other servers and MPLS encryptor 130, for example. Servers 150 may also include a data storage memory such as a random access memory (RAM) or another dynamic storage device that stores information, such as network policies, quality of service (QoS) requirements and LSP labels associated with network policies and QoS requirements, as described in detail below. Servers 150 may also include a communication interface that may include any transceiver-like mechanism that enables server 150 to communicate with other devices and/or systems. For example, server 150 may include a modem or an Ethernet interface to MPLS encryptor 130. In addition, server 150 may include other mechanisms for communicating data via a network, such as a wireless network, for example.

Client devices 160 may include one or more processors or microprocessors enabled by software programs to perform functions, such as data storage and transmission, codec conversion, and interfacing with networks 140, servers 150 and MPLS encrpytors 130, for example. Client devices 160 may include software to enable communications over networks 140, network 120 and/or other networks, such as the Internet. Client devices 160 may also include a data storage memory, such as a random access memory (RAM) or another dynamic storage device that stores information. Client devices 160 may also include one or more input devices, such as a keyboard for entering data, a mouse for selecting data or pointing to data, and one or more output devices, such as display or monitor for outputting information to a user.

Boundary 170 illustrated in FIG. 1 as a dashed line, may define a boundary between networks, 120 and 140 for example, where networks 140-1 and 140-2 may be networks of high trust and network 120 may be a network of low trust. For example, networks 140-1 and 140-2 may be referred to as "trusted" networks, server 150-1 may be referred to as a "trusted" server, and client devices 160-1 and 160-2 may be referred to as "trusted" clients. Also, for example, network 120 may be referred to as an "untrusted" network and server 150-2 may be referred to as an "untrusted" server.

Figure 2:
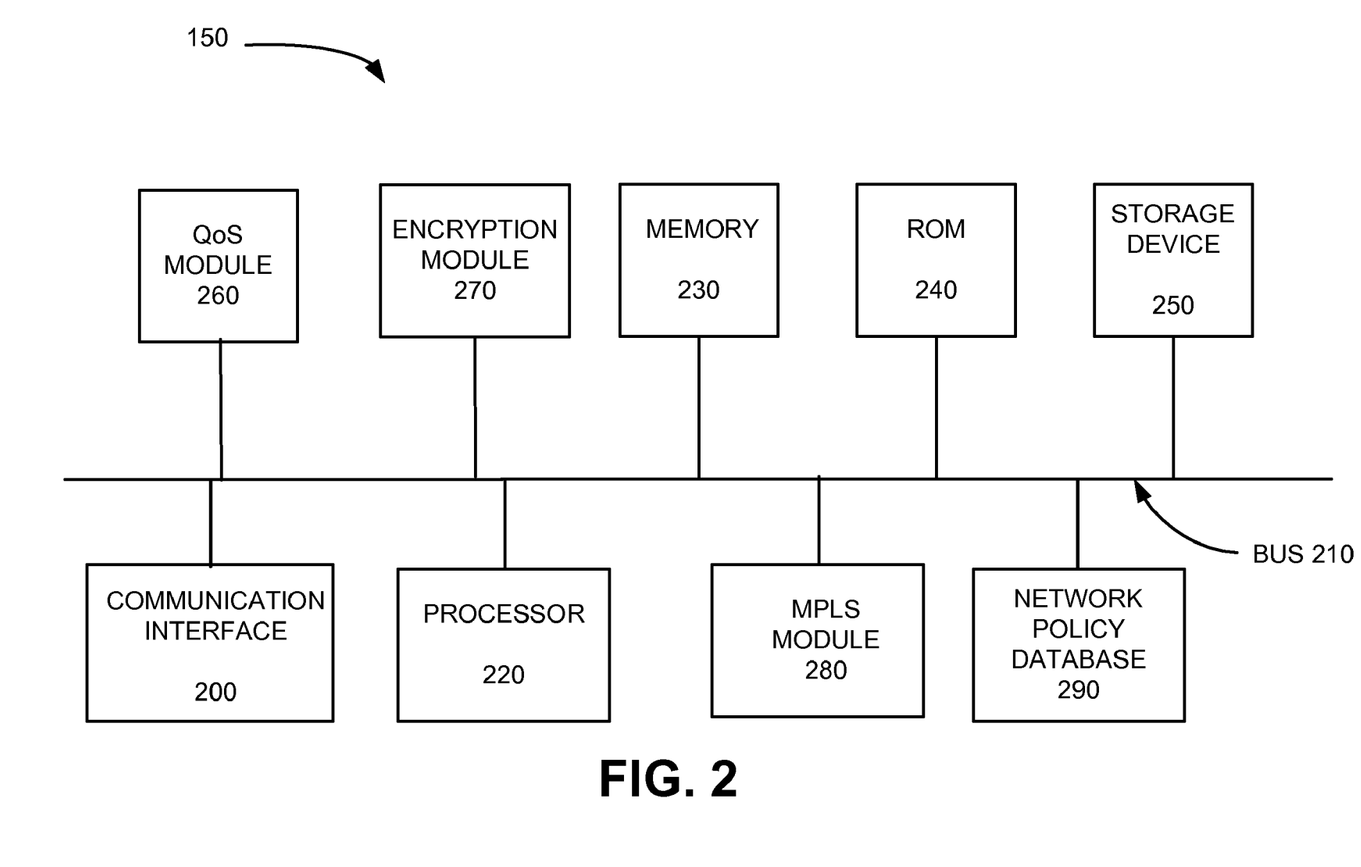
FIG. 2 is a diagram of an exemplary server as shown in FIG. 1.

FIG. 2 is a diagram of an exemplary configuration of server 150-1. Server 150-1 may include communication interface 200, bus 210, processor 220, memory 230, read only memory (ROM) 240, storage device 250, Quality of Service (QoS) module 260, encryption module 270, MPLS module 280, and network policy database 290. Bus 210 permits communication among the components of server 150-1. Server 150-1 may also include one or more power supplies (not shown) and may be configured in a number of other ways and may include other or different elements.

Communication interface 200 may include communication mechanisms that enable server 150 to communicate with other devices and/or systems. For example, communication interface 200 may include a modem or an Ethernet interface to a WAN or LAN. In addition, communication interface 200 may include other mechanisms for communicating via a network, such as a wireless network. Communication interface 200 may also include transmitters and receivers for communicating data to/from MPLS encryptors 130 and client devices 160, for example.

Processor 220 may include any type of processor or microprocessor that interprets and executes instructions. Processor 220 may also include logic that is able to decode media files, such as audio files, video files, etc., and generate output to, for example, a speaker, a display, etc. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions. Storage device 250 may also include a flash memory (e.g., an electrically erasable programmable read only memory (EEPROM)) device for storing information and instructions.

Quality of Service (QoS) module 260 may include one or more mechanisms that may provide quality of service information relating to communications and network policies, for example. For example, QoS module 260 may receive a communication requesting a connection over a network in accordance with a network policy and QoS module 260 may provide quality of service information associated with the network policy. For example, QoS module 260 may provide information relating to bandwidth required for voice and/or video calls.

Encryption module 270 may include one or more mechanisms that may encrypt digital data before transmission over a network. For example, encryption module 270 may include software programs that may modify and encrypt data to be transmitted. Encryption module 270 may also transmit information relating to encryption keys necessary to decrypt data, for example.

MPLS module 280 may include, for example, data relating to LSP labels and data relating to establishing communications over MPLS networks. For example, MPLS module 280 may contain LPS labels with associated network policies. These stored LSP labels and associated policies may be received and stored in a process described in detail below.

Network policy database 290 may contain a database of network policies, for example. For example, authorization and/or validation policies, policies for establishing communications, prioritized policies for recovering from network failures, and class of service policy requirements for voice and video connections, for example.

According to an exemplary implementation, server 150-1 may perform various processes in response to processor 220 executing sequences of instructions contained in memory 230. Such instructions may be read into memory 230 from another computer-readable medium, such as storage device 250, or from a separate device via communication interface 200. It should be understood that a computer-readable medium may include one or more memory devices or carrier waves. Execution of the sequences of instructions contained in memory 230 causes processor 220 to perform the acts that will be described hereafter. In alternative embodiments, hard-wired circuitry may be used in place of or in combination with software instructions to implement the embodiments. Thus, the systems and methods described are not limited to any specific combination of hardware circuitry and software.

Figure 3:
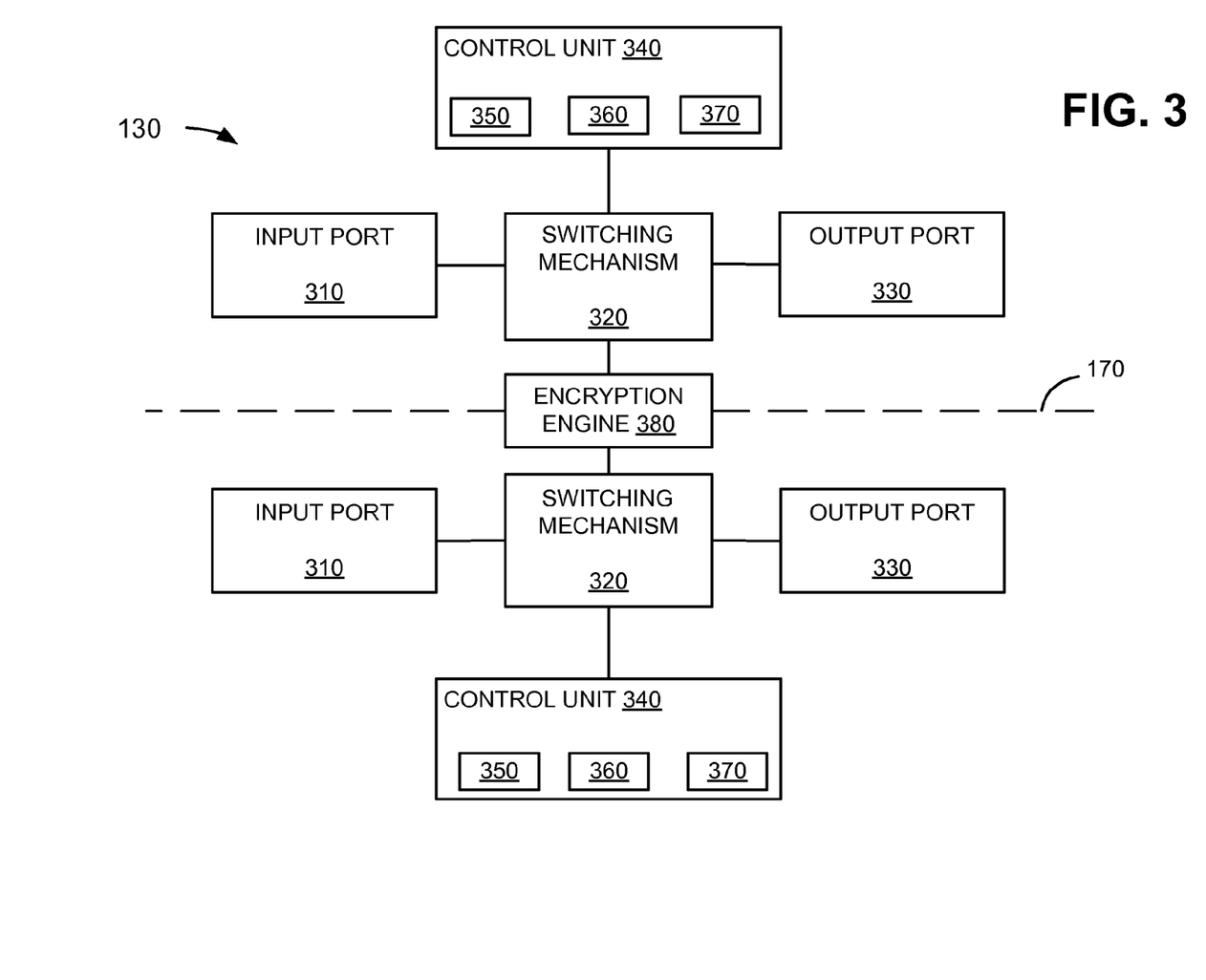
FIG. 3 is a diagram of an exemplary MPLS encryption device.

FIG. 3 is an exemplary diagram of an MPLS encryptor 130. MPLS encryptor 130 may include input ports 310, a switching mechanism 320, output ports 330, control units 340 and encryption engine 380. Boundary 170 (as also shown in FIG. 1 as a dashed line) may define a boundary between trusted and untrusted sides of MPLS encryptor 130. For example, input ports 310, out put ports 330, switching mechanism 320 and control unit 340 above line 170 may be referred to as "trusted" input ports, "trusted" output ports, "trusted" switching mechanism" and "trusted" control unit. Likewise, input ports 310, out put ports 330, switching mechanism 320 and control unit 340 below line 170 may be referred to as "untrusted" input ports, "untrusted" output ports, "untrusted" switching mechanism" and "untrusted" control unit. Encryption engine 380 may encrypt data that may be transmitted from trusted side of MPLS encryptor to the untrusted side of MPLS encryptor 130, as will be described in detail below.

Input ports 310 may be connected to networks 120 and 140, and may be the point of entry or exit for incoming/outgoing datagrams, for example. Input ports 310 may include logic to carry out datalink layer encapsulation and decapsulation. Input ports 310 may also include logic to look up a destination port of an incoming datagram in a forwarding table. Input ports 310 may receive data from networks 120 and 140 and may run datalink-level protocols or network-level protocols.

Switching mechanisms 320 may interconnect input ports 310 with output ports 330. Switching mechanisms 320 may be implemented using many different techniques. For example, switching mechanism 320 may include busses, crossbars, and/or shared memories. In one implementation, simplest switching mechanism 320 may include a bus that links input ports 310 and output ports 330. A crossbar may provide multiple simultaneous data paths through switching mechanism 320. In a shared-memory switching mechanism 320, incoming datagrams may be stored in a shared memory and pointers to datagrams may be switched. Switching mechanisms 320 may be controlled by control units 340 in order to receive and transmit data between networks 140 and 120, for example.

Output ports 330 may store datagrams before they are transmitted on an output link or connection, to networks 120 and 140, for example. Output ports 330 may further include logic executing scheduling algorithms that support priorities and guarantees. Output ports 330 may connect to networks 120 and 140 and may support datalink layer encapsulation and decapsulation, and/or a variety of higher-level protocols.

Control units 340 may control switching mechanisms 320 to interconnect input ports 310 to output ports 330. Control units 340 may compute a forwarding table, implement routing protocols, and/or run software to configure transmissions between networks via encryption engine 380. Control unit 340 may also handle any datagram whose destination address may not be found in the forwarding table.

In one implementation, control units 340 may include a transmission guard 350, a processor 360 and a memory 370. Transmission guard 350 may include hardware and software mechanisms that may direct or prohibit transmissions between trusted and untrusted networks. For example, transmission guard 350 may direct transmissions from trusted network 140 to be routed through switching mechanisms 320 and encryption engine 380 to untrusted network 120, while transmission guard 350 may block transmissions from untrusted network 120 from entering into trusted network 140, for example. Processor 360 may include a microprocessor or processing logic that may interpret and execute instructions. Memory 370 may include a random access memory (RAM), a read only memory (ROM) device, a magnetic and/or optical recording medium and its corresponding drive, and/or another type of static and/or dynamic storage device that may store information and instructions for execution by the processor. Memory 370 may also store a label information base (LIB) as described below.

Encryption engine 380 may include one or more mechanisms that may encrypt digital data before transmission over a network. For example, encryption module 380 may include software programs that may modify data to be transmitted from trusted network 140 through untrusted network 120. Encryption engine 380 may encrypt data received from trusted side of MPLS encryptor 130-1 before it is output on untrusted side of MPLS encryptor 130-1, for example.

In order to set up an LSP through network 120, each of the trusted and untrusted sides of MPLS encryptor 130 may set up a label information base (LIB) stored in memory 370, which may map incoming data from an input port 310 of MPLS encryptor 130 to an output port 330 of MPLS encryptor 130. For example, LIB stored in memory 370 in the trusted side of MPLS encryptor 130, may contain two associated columns in a table, wherein a first column stores LSP labels for communications over untrusted network 120, and a second associated column stores QoS and/or network policy information received from trusted communications via trusted network 140, that may be associated with an LSP label in the first column. LIB stored in memory 370 in the untrusted side of MPLS encryptor 130 may store two columns of associated LSP labels which may map incoming data from an untrusted input port 310 to an untrusted output port 330 of MPLS encryptor 130.

Upon receiving data from trusted client 160-1 via a trusted input port 310, for example, LIB may map QoS and/or network policy information received with the data from trusted client device 160-1 to an appropriate entry in the second column of the LIB. The LIB may then map the second column to an associated first column, where an associated LSP label stored in the first column of LIB may then be applied to the received data for transmission through untrusted network 120 with the requested QoS, for example. In this example, data received via a trusted input port 310 may pass through encryption engine 380, for encryption, prior to being sent to an untrusted output port 330. In this manner, data transmissions received from trusted network 140 may be encrypted and labeled with an LSP label, before transmission to untrusted network 120, without allowing untrusted network 120 to access the data received from trusted network 140, for example.

After data may be encrypted, labeled and output by MPLS encryptor 130, network devices 110 may forward the data as a datagram along links 111 through MPLS network 120 based on the LSP label applied. An LSP label may be swapped to a new label at each network device 110. In this way, an LSP label may identify the specific path of network devices 110 and links 111 that a datagram may take through MPLS network 120.

MPLS encryptor 130, consistent with principles of the embodiments, may perform certain operations, as described in detail below. MPLS encryptor 130 may perform these operations in response to processor 360 executing software instructions contained in a computer-readable medium, such as memory 370. A computer-readable medium may be defined as a physical or logical memory device and/or carrier wave.

The software instructions may be read into memory 370 from another computer-readable medium, such as a data storage device, or from another device via a communication interface. The software instructions contained in memory 370 may cause processor 360 to perform processes that will be described later. Alternatively, hardwired circuitry may be used in place of or in combination with software instructions to implement processes consistent with principles of various embodiments. Thus, implementations consistent with principles of exemplary embodiments are not limited to any specific combination of hardware circuitry and software.

Figure 4A:
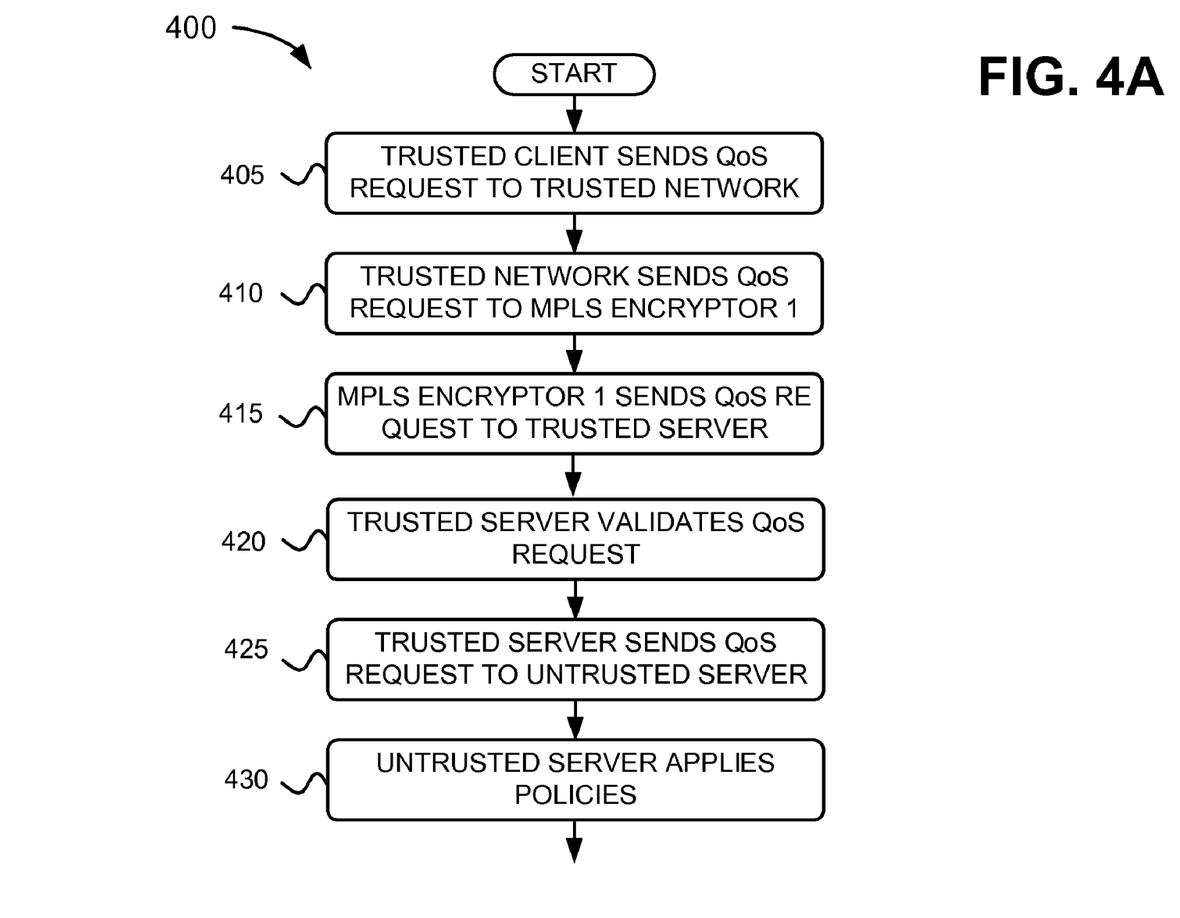
FIGS. 4A-4C are flow diagrams illustrating exemplary processing performed by the system of FIG. 1.
Figure 4B:
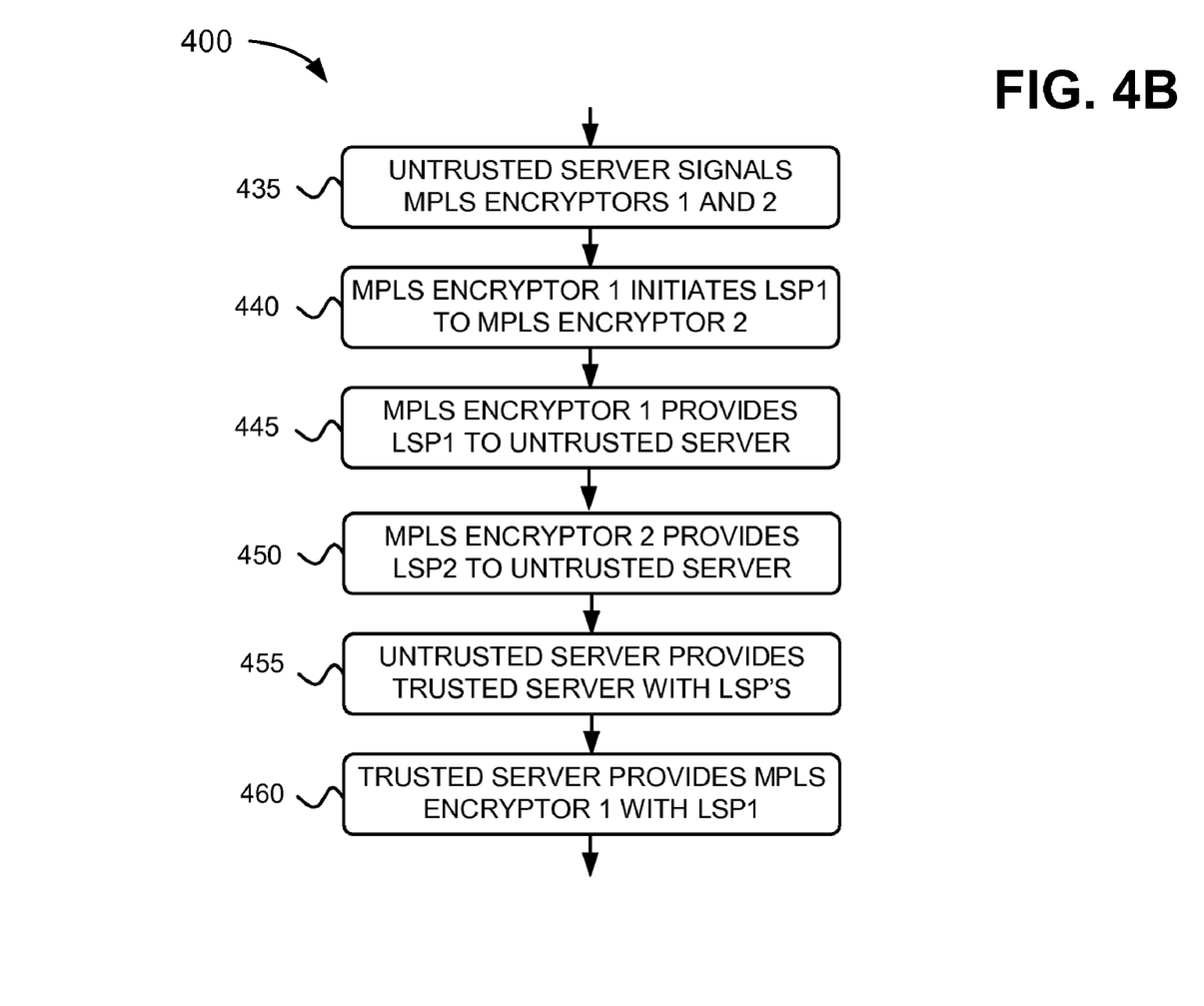
Figure 4C:
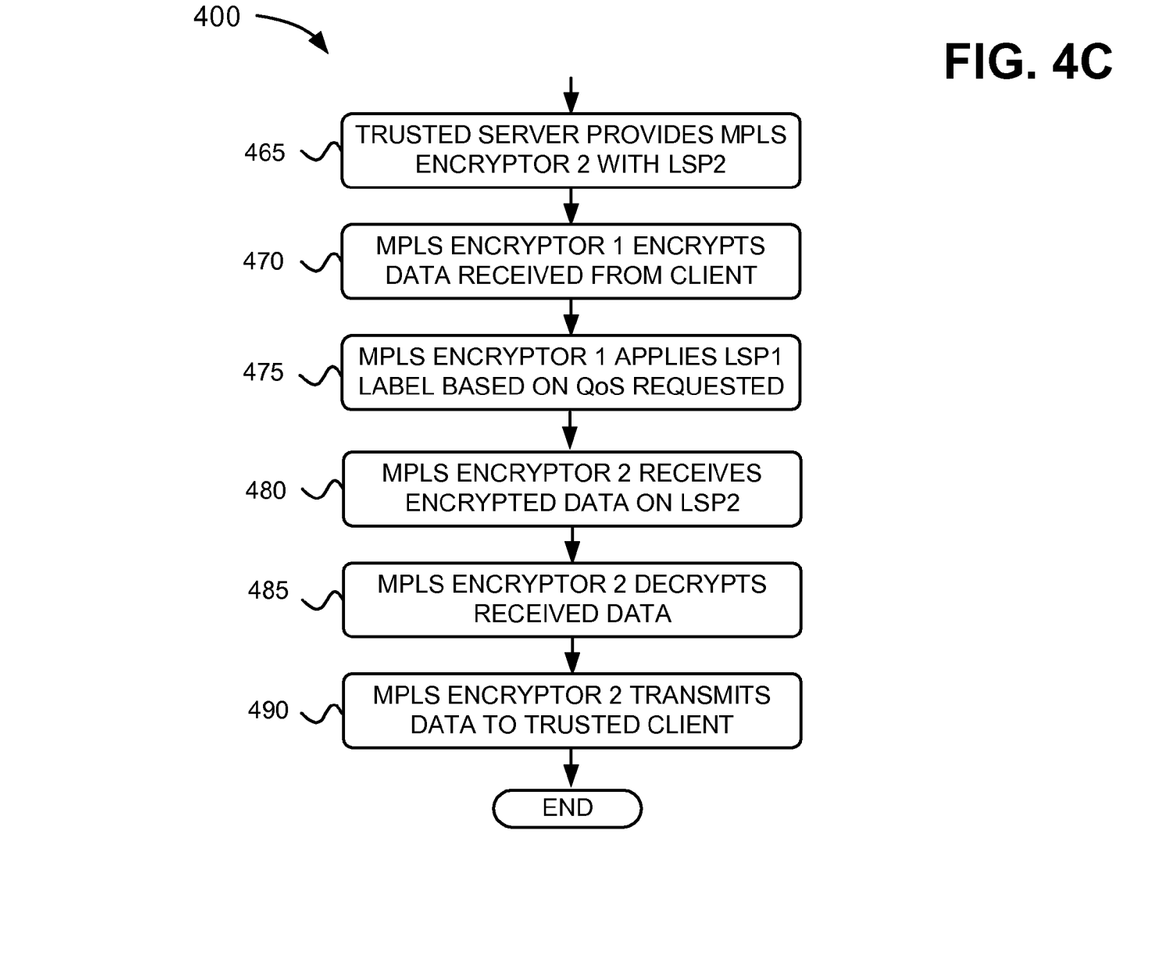

FIGS. 4A to 4C illustrate exemplary processing 400 performed by system 100. In one implementation for example, processing 400 may begin when trusted client 160-1 sends a Quality of Service (QoS) request to trusted network 140-1

(act 405). For example, client 160-1 may desire to establish a video call to client 160-2 that requires a high QoS connection. Trusted network 140-1 may then send this request for QoS to MPLS encryptor 130-1 (act 410). In response to receiving this request for example, MPSL encrpytor 130-1 may forward the QoS request to trusted server 150-1 (act 415). Upon receiving this QoS request, trusted server 150-1 may validate the request (act 420). For example, trusted server 150-1 may access QoS module 260 and network policy database 290 to validate and authorize the received request for service. Trusted server 150-1 may then transmit a QoS request to untrusted server 150-2 (act 425). For example, trusted server 150-1 may transmit a QoS request through MPLS encryptor 130-3 and through network 120 to untrusted server 150-2.

Untrusted server 150-2 may then receive this request for service and apply policies necessary to establish the requested service (act 430). For example, untrusted server 150-2 may contain a QoS module 260 and a network policy database 290 similar to that shown in FIG. 2, for example. Once untrusted server 150-2 validates the request, untrusted server 150-2 may then transmit this request for service to MPLS encryptors 130-1 and 130-2 (act 435). For example, server 150-2 may signal MPLS encryptor 130-1 via network 120, that a connection may be established from MPLS encryptor 130-1 to MPLS encryptor 130-2 via network 120, and similarly, signals MPLS encryptor 130-2 via network 120, that a connection may be established from MPLS encryptor 130-2 to MPLS encryptor 130-1 via network 120, for example.

MPLS encryptor 130-1 may then initiate an LSP (LSP1) to establish the requested QoS connection from MPLS encryptor 130-1 to MPLS encryptor 130-2 over network 120 (act 440). For example, transmission guard 350 may route the request for an LSP to the LIB in memory 370 of untrusted control unit 340 (FIG. 3). MPLS encryptor 130-1 may then access or determine an LSP label "LSP1" used to form a path through network 120. MPLS encryptor 130-1 may then transmit LSP1 to untrusted server 150-2 (act 445). Similarly, MPLS encryptor 130-2 may also determine an LSP label "LSP2" to establish the requested QoS from MPLS encryptor 130-2 to MPLS encryptor 130-1 over network 120. For example, MPLS encryptor 130-2 may access LIB stored in memory 370, in untrusted control unit 340, for example. MPLS encryptor 130-2 may then transmit LSP2 to untrusted server 150-2 (act 450).

Untrusted server 150-2 may then provide the LSP's (LSP's 1 and 2 provided from encryptors 130-1 and 130-2) to trusted server 150-1 (act 455). For example, untrusted server 150-2 may signal the LSP's (i.e. LSP1 and LSP2) to trusted server 150-1 via network 120, and via MPLS encryptor 130-3, for example. Trusted server 150-1 may store these LSP's in MPLS module 280 (FIG. 2), for example. Trusted server 150-1 may then transmit LSP1 to MPLS encryptor 130-1 (act 460) and transmit LSP2 to MPLS encryptor 130-2 (act 465). For example, trusted server 150-1 may transmit information to MPLS encryptor 130-1 that may include LSP1 and information associating LSP1 with a defined quality of service. Transmission guard 350 may direct this transmission to trusted control unit 340, which may map received LSP1 and associated quality of service information to the LIB stored in trusted memory 370, for example. For example, LSP1 may be stored in a first column and the associated quality of service information may be stored in the second column of LIB in memory 370 of trusted control unit 340.

MPLS encryptor 130-1 may then encrypt data received from trusted client 160-1 (act 470). For example, encryption engine 380 may apply encryption processing on the received data using stored algorithms, for example. Once encrypted, MPLS encryptor 130-1 may apply an LSP label based on the requested QoS received (act 475). For example, using LIB stored in memory 370 of trusted control unit 340, the received QoS request is mapped to an appropriate LSP label. The encrypted and LSP labeled data may then be transmitted through MPLS network 120 and may be received by MPLS encryptor 2 (130-2) on LSP2 (act 480). Once received by MPLS encryptor 2 (130-2), the received data may be decrypted (act 485). For example, encryption engine 380 in MPLS encryptor 2 (130-2), may perform decryption processing based on stored algorithms. After being decrypted, the data may be forwarded to trusted client 160-2 (act 490).

In this manner, process 400 may provide requested QoS communications between two trusted networks (140-1 and 140-2) over an untrusted network 120, without signals being transmitted directly from trusted network 140 over untrusted network 120 indicating that a specific QoS may be required. In this manner, transmissions from trusted networks 140 appear to be handled in the same manner as other transmissions over network 120.

Figure 5:
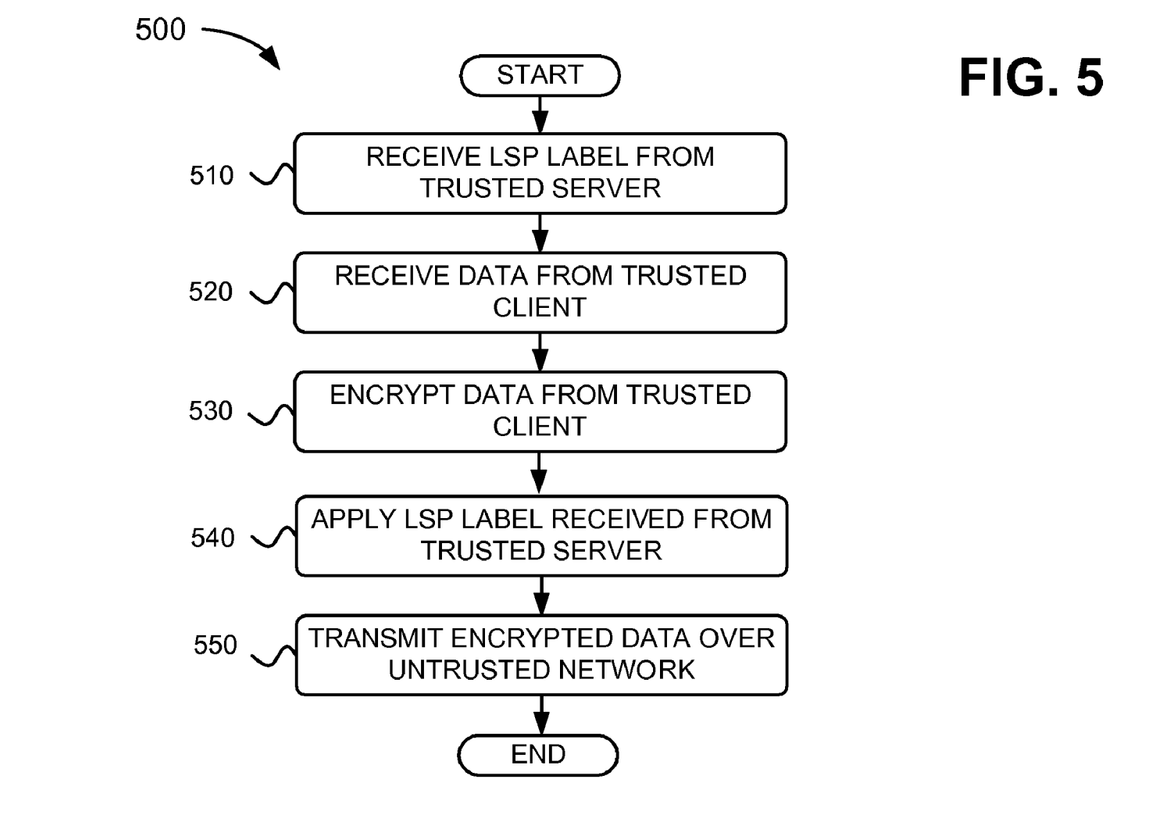
FIG. 5 is a flow diagram illustrating exemplary processing performed by MPLS encryption device of FIG. 3.

FIG. 5 illustrates exemplary processing 500 performed by MPLS encryptor 130. In one implementation for example, processing 500 may begin when MPLS encryptor 130-1 receives an LSP label and information relating the LSP, such as a desired QoS or policy from trusted server 150-1 (act 510). For example, act 510 may be performed in a similar manner as act 460 of process 400, i.e., after the determination and transmission of LSP labels as described in acts 405-455. In other embodiments, the LSP labels and associated QoS or policy information may be received from trusted client 160-1 (act 510). MPLS encryptor 130-1 may then receive data from trusted client 160-1 (act 520). For example, trusted client 160-1 may begin to transmit data to MPLS encryptor 130-1, which may be transmitted via network 120 to trusted client 160-2. MPLS encryptor 130-1 may then encrypt this received data (act 530). For example, using encryption algorithms stored in encryption engine 380 (FIG. 3), MPLS encryptor 130-1 may encrypt the data received from client 160-1. MPLS encryptor 130-1 may then apply an LSP label received from trusted server 150-1 (act 540). For example, MPLS encryptor 130-1 may access the second column of LIB stored in trusted memory 370, based on the received data and associated QoS from trusted client 160-1, in order to apply the appropriate LSP label from the first column of LIB, for transmission of data through network 120 with the desired QoS, for example. MPLS encryptor 130-1 may then begin to transmit the encrypted data over network 120 (act 550). As described above, the LSP labels may be determined by the process of FIG. 4, wherein each LSP label is associated with a desired QoS through network 120.

In further implementations, the process of FIG. 5 may be employed to establish multiple paths or connections over network 120, based on network policies or priorities. For example, encryptor 130-1 may receive multiple LSP labels determined from associated policies and priorities from server 150-1. For example, server 150-1 may perform the process described in FIG. 4, and store multiple LSP labels with associated policies in MPLS module 280. These stored LSP labels may be used to establish multiple connections through network 120 in order to avoid network failures.

The stored LSP labels may also be associated with policies relating to hierarchies or priorities of re-establishing connections in case of a network failure, for example. In case of a network failure, for example, LSP labels and related information may be transmitted in a prioritized order from server 150-1 and may be received and stored in LIB in trusted memory 370 of MPLS encryptor 130-1, for example. In this manner, MPLS encryptor 130-1 may be used to re-establish connections through network 120 based on network priorities.

Systems and methods described herein may provide a way of transmitting encrypted information with a desired quality of service over an untrusted MPLS network.

The foregoing description of preferred embodiments provides illustration and description, but is not intended to be exhaustive or to limit the embodiments to the precise form disclosed. Modifications and variations are possible in light of the above teachings or may be acquired from practice of the embodiments.

Also, while series of acts have been described with regard to the flowcharts of FIGS. 4A-4C and 5, the order of the acts may differ in other implementations consistent with principles of the embodiments. Further, non-dependent acts may be performed in parallel.

No element, act, or instruction used in the present application should be construed as critical or essential to the systems and methods described herein except when explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, at a network device, one or more label switched path (LSP) labels that define one or more quality of service paths through a first network, the one or more LSP labels being received from a second network, the first network being an untrusted network and the second network being a trusted network;
   receiving, by the network device, data from the second network,
   the received data to be transmitted through the first network, and
   the received data including information identifying a particular quality of service;
   receiving, by the network device and from another network device in the first network, information indicating a connection, associated with the received data, to be established based on the particular quality of service;
   encrypting, by the network device, the received data after receiving the information indicating the connection to be established;
   identifying, by the network device, a particular LSP label, of the one or more LSP labels, to apply to the encrypted data,
   identifying the particular LSP label including mapping the information identifying the particular quality of service to quality of service information associated with the particular LSP label;
   applying, by the network device, the identified particular LSP label to the encrypted data; and
   transmitting, by the network device, the encrypted data with the applied particular LSP label through the first network.

2. The method of claim 1, where receiving the one or more LSP labels includes:
   receiving the one or more LSP labels from a server in the second network.

3. The method of claim 1, further comprising:
   storing the one or more LSP labels in a memory that stores a plurality of LSP labels, quality of service information, and network policy information,
   where each of the plurality of LSP labels is associated with at least one of:
      particular quality of service information of the stored quality of service information, or
      particular network policy information of the stored network policy information.

4. The method of claim 1, further comprising:
   identifying an output port, of the network device, to transmit the encrypted data, based on the identified particular LSP label; and
   transmitting, after applying the identified particular LSP label, the encrypted data via the identified output port of the network device.

5. The method of claim 4, where identifying the output port comprises:
   mapping the identified particular LSP label, associated with a particular input port, to a corresponding LSP label, associated with the identified output port.

6. A network device comprising:
   a memory to:
      store a plurality of label switched path (LSP) labels and quality of service information, each LSP label, of the stored plurality of LSP labels, defining a path, through a first network, that is associated with a particular quality of service, each LSP label, of the stored plurality of LSP labels, being associated with corresponding quality of service information of the stored quality of service information, and the first network corresponding to an untrusted network; and
   logic, implemented at least partially in hardware, to:
      receive data from a second network to be transmitted through the first network, the data including a request for a quality of service, and the second network being different than the first network;
      receive, from another network device associated with the first network, information indicating a connection, associated with the data, to be established based on the quality of service of the request;
      encrypt the data received from the second network after receiving the information indicating the connection to be established;
      map the quality of service, of the request, to particular quality of service information of the stored quality of service information;
      select a particular LSP label, of the plurality of LSP labels, that is associated with the particular quality of service information;
      apply the selected particular LSP label to the encrypted data; and
      transmit the encrypted and LSP labeled data through the first network via a path identified by the applied particular LSP label.

7. The network device of claim 6, where the first network is a multi-protocol label switching (MPLS) network.

8. The network device of claim 6, where the data, received from the second network, is transmitted by a client device, to the network device, via the second network.

9. The network device of claim 6, further comprising:
   a first portion that receives the data from the second network;
   a second portion, different than the first portion, that transmits the encrypted data with the applied LSP label to the first network; and
   an encryption engine to:
      receive the data from the first portion,
      encrypt the data received from the first portion, and forward the encrypted data to the second portion, where the second portion transmits the encrypted data with the applied LSP label via the first network.

10. The network device of claim 6, where the network device comprises a first portion that receives data from the second network and a second portion, different than the first portion, that transmits data to the first network, and
where the plurality of LSP labels and the quality of service information are stored in the first portion of the network device.

11. A method comprising:
transmitting, by a network device and to a server that is associated with a particular network, a request for a label switched path (LSP) label that defines a path through a multi-protocol label switching (MPLS) network, the path being associated with a particular quality of service, the MPLS network being an untrusted network, and the particular network being different than the MPLS network;
receiving, by the network device and from the server, the LSP label via the particular network;
receiving, by the network device, data from the particular network,
the data to be transmitted, via the MPLS network, based on a quality of service that corresponds to the particular quality of service;
receiving, by the network device and from another network device associated with the MPLS network, information indicating a connection, associated with the data, to be established based on the quality of service;
encrypting, by the network device, the data after receiving the information indicating the connection to be established;
identifying, by the network device, the LSP label based on the quality of service;
applying, by the network device, the LSP label to the encrypted data; and
transmitting, by the network device, the encrypted data with the applied LSP label via the path through the MPLS network.

12. The method of claim 11, where receiving the data comprises:
receiving a request to transmit the data via the MPLS network based on the quality of service, the request being received from a client device that is associated with the particular network.

13. The method of claim 11, further comprising:
storing the received LSP label; and
retrieving the received LSP label based identifying the LSP label.

14. The method of claim 13, where the network device comprises a first portion that receives data from the second network, and
a second portion, different than the first portion, that transmits data to the first network, and
where storing the received LSP label comprises:
storing the received LSP label and the particular quality of service in a memory, in the first portion, that stores a plurality of LSP labels and quality of service information, where each of the plurality of LSP labels is mapped to corresponding quality of service information of the stored quality of service information.

15. A non-transitory computer-readable medium comprising:
one or more instructions which, when executed by at least one processor of a network device, cause the at least one processor to:
store a plurality of label switched path (LSP) labels and quality of service information,
each LSP label, of the stored plurality of LSP labels, defining a path, through a first network, that is associated with a particular quality of service, and each LSP label, of the stored plurality of LSP labels, being associated with corresponding quality of service information of the stored quality of service information, the first network corresponding to an untrusted network;
receive data, from a second network, that is to be transmitted through the first network, the data including a request for a quality of service, and the second network being different than the first network;
receive, from another network device in the first network, information indicating a connection, associated with the data, to be established based on the quality of service;
encrypt the data received from the second network after receiving the information indicating the connection to be established;
map the quality of service, of the request, to particular quality of service information of the stored quality of service information;
select a particular LSP label, of the plurality of LSP labels, that is associated with the particular quality of service information;
encapsulate the encrypted data using the selected particular LSP label; and
transmit the encapsulated data through the first network via a path identified by the particular LSP label.

16. The non-transitory computer-readable medium of claim 15, where the one or more instructions to receive the data comprise:
one or more instructions to receive, from a client device that is associated with the second network, a request to transmit the data via the first network based on the quality of service,
where the first network corresponds to a multi-protocol label switching (MPLS) network, and
where the second network correspond to a trusted network.

17. The non-transitory computer-readable medium of claim 15, further comprising:
one or more instructions to receive, via the second network, the plurality of LSP labels and quality of service information from another network device.

18. The non-transitory computer-readable medium of claim 17, where the first network corresponds to a multi-protocol label switching (MPLS) network, and
where the second network corresponds to a trusted network.

* * * * *